Nov. 14, 1950  K. C. BUGG ET AL  2,530,114

REEL

Filed Sept. 1, 1945  4 Sheets-Sheet 1

INVENTORS.
Kenly C Bugg.
BY Harry L. Hart,

Nov. 14, 1950 K. C. BUGG ET AL 2,530,114
REEL
Filed Sept. 1, 1945 4 Sheets-Sheet 2

INVENTORS.
Kenly C. Bugg,
BY Harry L. Hart,

Nov. 14, 1950 K. C. BUGG ET AL 2,530,114
REEL
Filed Sept. 1, 1945 4 Sheets-Sheet 4
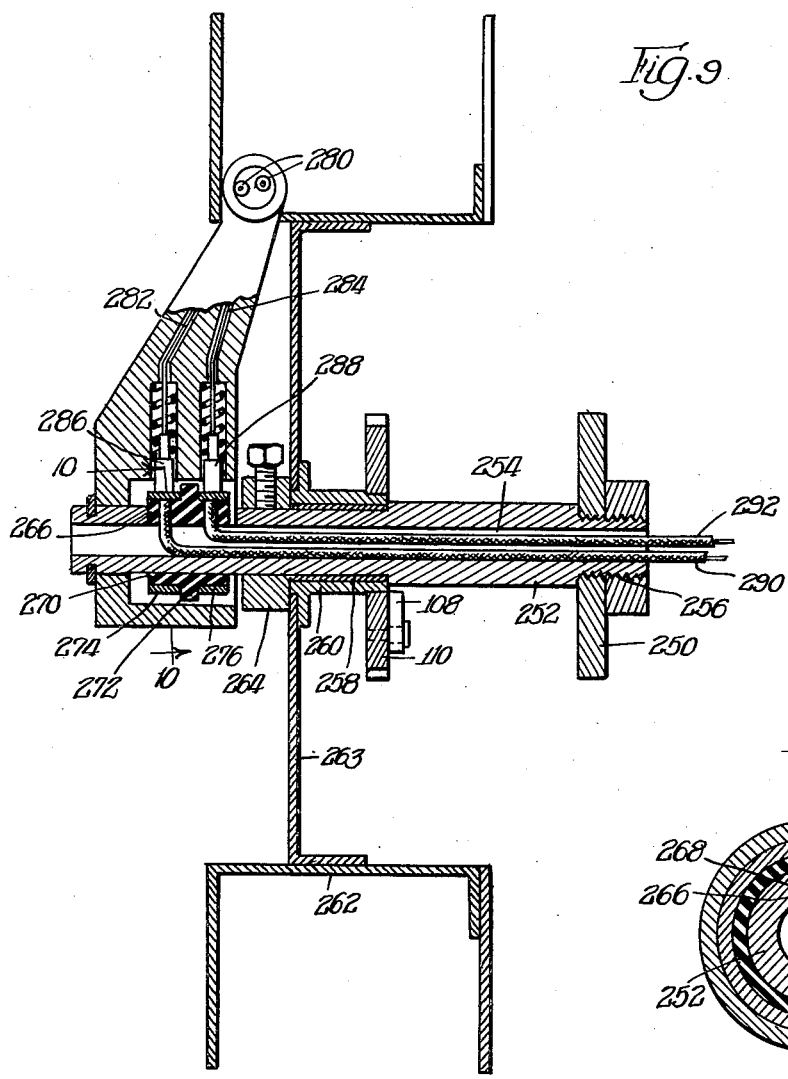
INVENTORS.
Kenly C. Bugg,
Harry L. Hart,
BY Patented Nov. 14, 1950

2,530,114

UNITED STATES PATENT OFFICE 2,530,114

REEL

Kenly C. Bugg and Harry L. Hart, Fort Wayne, Ind.; said Hart assignor to said Bugg Application September 1, 1945, Serial No. 613,976

25 Claims. (Cl. 242—107)

This invention pertains to reels and more particularly to retrieving mechanism for storage, dispensing, etc., reels for ropes, lines, hose, electric wire, etc.

It is an object of this invention to provide a retracting reel having power storing mechanism capable of rewinding long lengths of line without the use of long, heavy and expensive springs.

Another object of this invention is to provide a retracting reel having power storing mechanism capable of rewinding long lengths of line, wherein a short length of spring is utilized to perform a rewinding function usually performed by a long spring.

Another object of the invention is to provide a retracting reel having power storing mechanism capable of rewinding long lengths of line, wherein a short length of spring is utilized with mechanism so constructed and arranged that it can be made to rewind an indefinite length of line, which line cannot be rewound with the usual retracting mechanism provided with the conventional long spring.

Another object of the invention is to provide a retracting reel having power storing mechanism capable of rewinding long lengths of line, wherein a short length of spring is utilized which can be periodically re-energized by withdrawing a length of line to thereby rewind long lengths of line.

Another object of the invention is to provide a retracting reel having power storing mechanism capable of rewinding long lengths of line, wherein a short length of spring is utilized to perform a rewinding function wherein after the spring is energized a predetermined amount by the unwinding of the line, the energization of the spring is arrested, regardless of the additional unwinding of the line.

Another object of this invention is to provide a retracting reel having power storing mechanism capable of rewinding long lengths of line wherein the spring of the power storing mechanism is energized only a predetermined amount regardless of the length of line withdrawn, and wherein it is not necessary to use holding dogs, cams or other devices to prevent the reel from rewinding. Consequently it is not necessary to provide tripping or releasing devices for such dogs, cams or other devices, but it is only necessary to unwind a small additional amount of line, and release it for small rewinding at which point there is an arresting of rewinding tendency, and thereafter it is only necessary to withdraw a small amount more of line to condition the reel for rewinding.

Another object of this invention is to provide a retracting reel having power storing mechanism capable of rewinding long lengths of line and one which utilizes mechanism, such as differential mechanism, so that the rewinding mechanism, which includes the power storing means, can be very small whereby it readily can be used for lamp cords, telephone cords, electric razor cords, vacuum sweeper cords, and for all uses where long lengths of line must be stored in small places and economically.

Another object of this invention is to provide a retracting reel having power storing mechanism capable of rewinding long lengths of line which can readily be used to store relatively heavy means, such as hoses and the like, but wherein relatively light, inexpensive and compact rewinding mechanism is utilized.

Another object of this invention is to provide a retracting reel having power storing mechanism capable of rewinding long lengths of line wherein either a coil or spiral spring may be used.

Another object of the invention is to provide power storing mechanism utilizing a differential mechanism so constructed and arranged that it automatically changes its capacity of power storing under predetermined conditions.

Another object of the invention is to provide a reel having power storing mechanism utilizing differential mechanism or the like, arranged to automatically change its capacity of power storing under predetermined conditions so that it can be made for a designed or desired capacity of rewind without additional power storing devices.

Another object of the invention is to provide a reel wherein a line can be unwound therefrom, fastened, and thereafter tightened to a desired tension, such as in the case of a clothes line reel.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 9 is a transverse, fragmentary sectional elevation of a reel for electric cords and the like, which is adapted to utilize the rewinding mechanism illustrated in Figures 1 to 7, inclusive; and, Figure 10 is an enlarged sectional plan view taken substantially in the plane as indicated by the line 10—10 of Figure 9.

Figure 1:
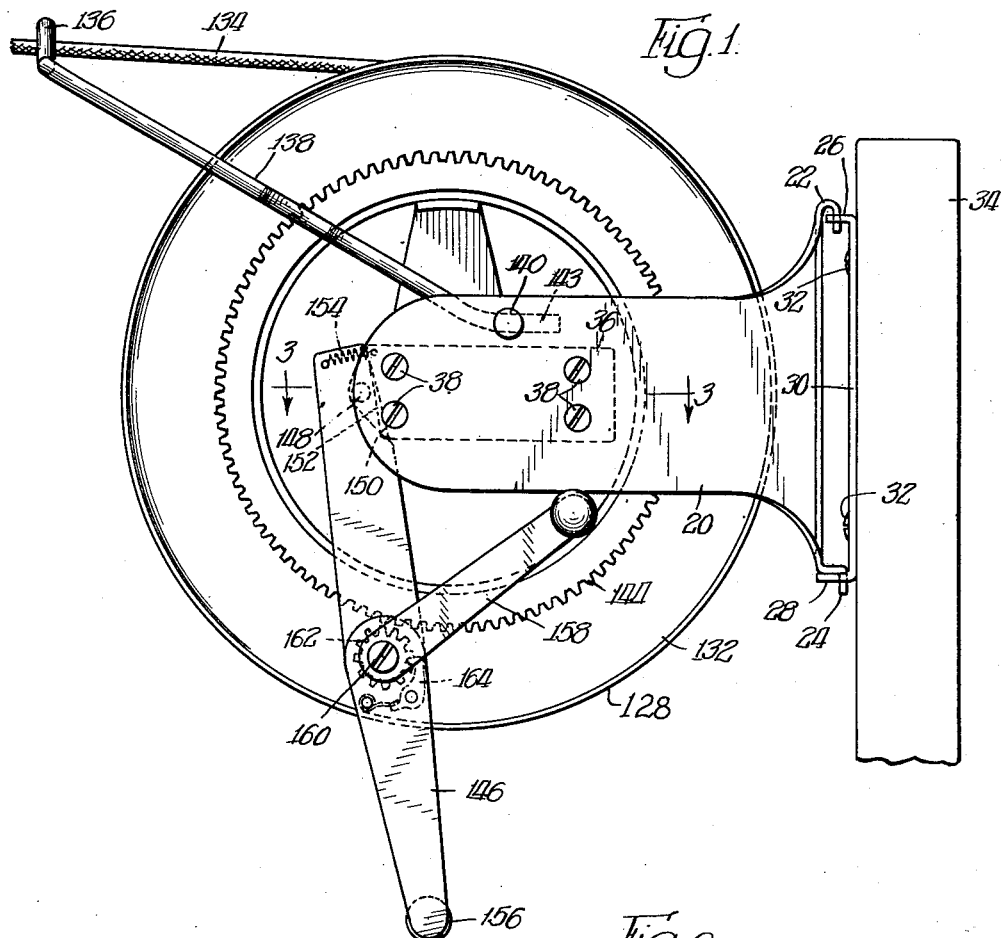
Figure 1 is a side elevation of a form of clothes line reel embodying the invention.
Figure 2:
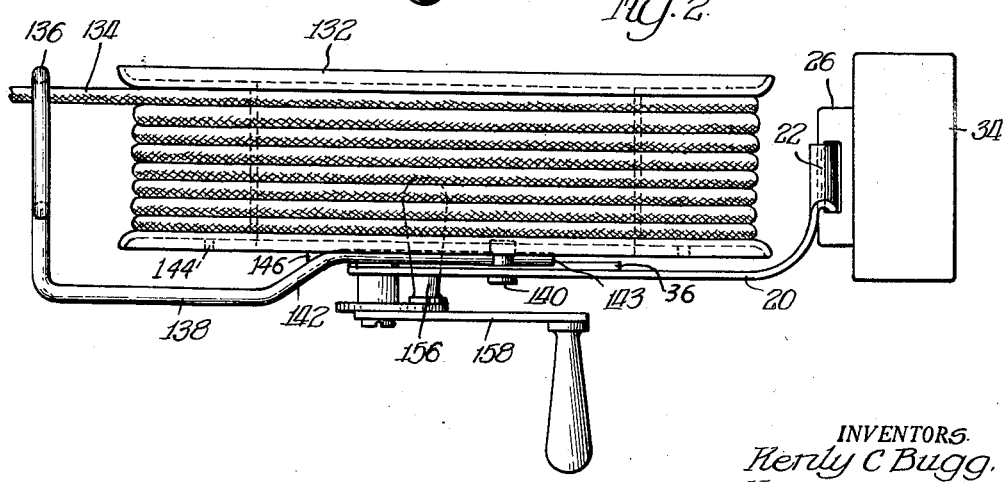
Figure 2 is a top plan view of the reel illustrated in Figure 1.
Figure 3:
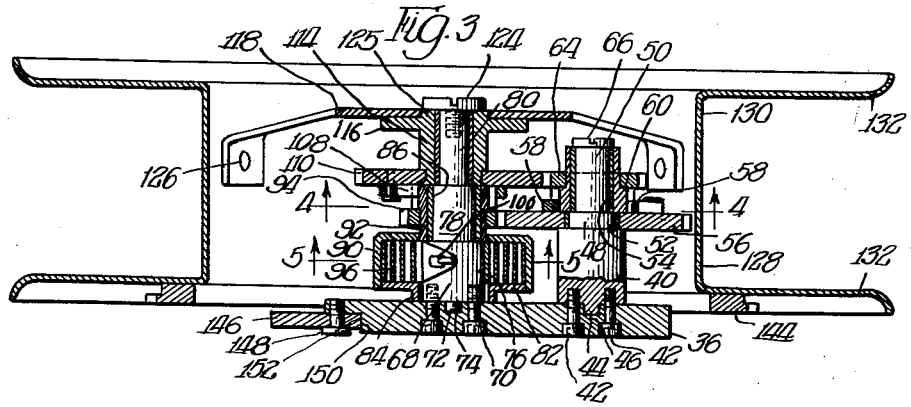
Figure 3 is a fragmentary sectional plan view taken substantially in the plane as indicated by the line 3—3 of Figure 1.
Figure 4:
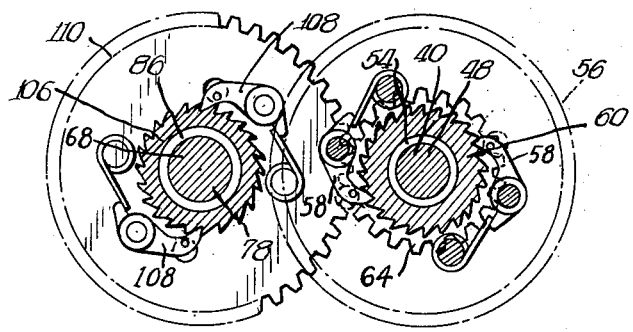
Figure 4 is an enlarged sectional elevation of certain gearing of the reel rewind mechanism, the same being taken substantially in the plane as indicated by the line 4—4 of Figure 3.
Figure 5:
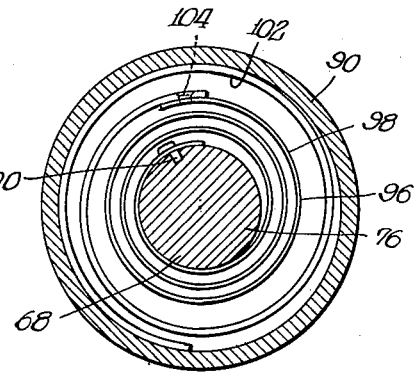
Figure 5 is a sectional elevation of the rewind spring and housing, the same being taken substantially in the plane as indicated by the line 5—5 of Figure 3.

The reel assembly illustrated in Figures 1 to 7 inclusive, is shown as adapted for use as a clothes line storing and retracting reel assembly. Said reel assembly consists essentially of a main bracket 20 provided with upper and lower male connecting members 22 and 24, adapted to be inserted in suitable female connecting members 26 and 28 provided on the bracket 30, the latter bracket being adapted to be connected as at 32 to a suitable support as a post 34. Bracket 36 is adapted to be secured as at 38 to bracket 20 and a fixed shaft member 40 (Figures 3 and 6) is secured as at 42 to bracket 36, shaft 40 being provided with the projection 44 adapted to be received in a suitable socket 46 of bracket 36 for positioning the shaft 40.

The shaft 40 is provided with stepped shaft portions 48 and 50 on which bushings 52 and 54 are respectively mounted. Gear 56 is rotatably mounted on the bushing 52 and is provided with the pivoted spring-pressed pawls 58, said pawls being adapted to engage the teeth of the ratchet gear 60. The ratchet gear 60 is provided with the hub 62 and said gear and hub are rotatably mounted on the bushing 54. Gear 64 is fixedly mounted on hub 62 adjacent the ratchet gear 60 and the assembly is completed by the bolt 66 being threaded into the end of shaft portion 50 and overlapping the end of hub 62 and bushing 54.

Fixed shaft 68 is secured as at 70 to the bracket 36 and is provided with the projection 72 received in the socket 74 provided in the bracket 36 for positioning said shaft, the shaft 68 being disposed adjacent to and in parallel relation with the shaft 40.

Shaft 68 is provided with the stepped shaft portions 76, 78 and 80, and the barrel or spring cap 82 is rotatably mounted on the portion 76 and is provided with an axial flange 84 disposed to rotate against or abut the bracket 36. Bushing 86 is mounted on the shaft portion 78, and spring drum 90 is staked or otherwise secured to the ratchet hub 92 rotatably mounted on the bushing 86, said ratchet hub being provided with the gear 94 secured to said hub and meshing with gear 56.

Coil spring assembly 96 (Figures 3 and 5) includes an inner coil spring 98 secured as at 100 to the shaft portion 76 of the shaft 68. The spring 98 is provided adjacent its outer end with the relatively stiffer or stronger spring shoe 102 secured thereto as at 104 and engaging the inside of drum 90, the shoe preferably being long to engage over a large area of the drum (the length of the spring being substantially 540° in the embodiment shown). The inner softer spring maintains substantially constant energization which when used with the outer stiffer shoe, gives a constant clutch action between the spring assembly and the drum. That is, there is substantially a constant clutch action of the outer shoe regardless of the geometric windup of the inner spring. This permits a relatively short, soft spring to give the effect of a long, stiff spring.

Hub 92 is provided with the ratchet gear 106 fixed thereto and being adapted to be engaged by the spring-pressed pivoted pawls 108. The pawls 108 are pivoted to gear 110 staked or otherwise secured to the hub 112 of reel hub 114, gear 110 meshing with gear 64. The reel rub 114 is provided with the flange 116 to which the reel arms 118 are fixed as at 120, the hub 112 being rotatably mounted on the bushing 122 mounted on the shaft portion 80, the assembly being completed by the bolt 124 secured to the end of shaft portion 80 and overlapping the end of reel hub 114. The end of reel rub 114 is preferably provided with a boss 125 facilitating assembly and supporting the arms 118.

The arms 118 are secured as at 126 to the inside of reel 128, the reel being provided with the drum or reel portion 130 and the side flanges 132, whereby storage means is provided for the flexible member such as the clothes line 134. The inner end of the clothes line is secured to the drum portion, the line is then coiled or wrapped around the drum portion between the flanges, and the outer end of the line passes outwardly through the elongated eye 136 provided on bracket 138, the bracket being conveniently pivoted as at 140 to bracket 20.

A suitable offset 142 and engagement between projection 143 and bracket 36 limits the oscillatory movement of the bracket 138. The drum portion 130 is provided with the ring gear 144 (Figure 1) which is fixed to said drum portion. A locking and tightening bracket 146 is pivoted as at 148 to bracket 36, being limited in its oscillatory movement with respect to bracket 36 by means of the adjacent edges 150 and 152 of bracket 36 and bracket 146, respectively.

Spring 154 secured to brackets 36 and 146 urges bracket 146 in a clockwise direction as viewed in Figure 1. The lower end of bracket 146 is provided with the handle 156 and a crank 158 is pivoted as at 160 to the bracket 146 and is provided with the gear 162 rotatable with crank 158 and adapted to mesh with gear 144 when the bracket 146 is moved in a counterclockwise direction as viewed in Figure 1.

A spring pressed pawl 164 is adapted to engage gear 162, whereby the crank 158 can only be rotated in a counterclockwise direction as viewed in Figure 1 and consequently reel 128 can only be rotated in a clockwise direction to tighten the line 134, and the pawl acts as means for preventing unwinding of the reel after the line has been tightened.

In the operation of this device let it be assumed that the line 134 is completely wound on the drum portion 130, and let it be assumed that the spring assembly 96 is not energized, and tightening bracket 146 is not in operative position, that is, gears 162 and 144 are not in engagement. The line 134 may be withdrawn from the drum portion 130 a desired amount, for example, let it be assumed a withdrawal of 100 feet. The outer end of the line can be secured to a suitable support, as a post, and the line tightened and held by moving bracket 146 to engage gears 162 and 144 and then rotating crank 158 a desired amount, after which pawl 164 locks the crank against loosening rotation.

When the line 134 is being removed from the drum portion 130, rotation of the reel in a counterclockwise direction, as viewed in Figure 1, causes rotation of the reel hub 114 (Figures 3 and 7), which in turn rotates gear 110 in a counterclockwise direction (Figure 4), rotating gear 64 in a clockwise direction, and assuming that the ratio of gears 110 and 64 is 2 to 1, for example, gear 64 rotates twice as fast as gear 110. Rotation of gear 64 causes ratchet gear 60 to rotate gear 56 at the same speed that gear 64 is rotating, through pushing engagement between the teeth of gear 60 and the pawls 58. Gear 56 rotating in a clockwise direction causes rotation of gear 94 (Figures 3 and 7) in a counterclockwise direction, and assuming that the ratio of gear 56 to gear 94 is 2 to 1, for example, gear 94 will rotate twice as fast as gear 56.

Gear 94 will be permitted to rotate with respect to gear 110 due to the ratchet connection 108—106. Spring drum 90 (Figures 3, 5 and 7) will rotate at the same speed as gear 94, causing a gradual energization of the spring assembly 96 to a point where the stiffer spring shoe 102 slips with respect to the drum 90. Thus in withdrawing the line, after a predetermined amount of line is withdrawn the spring slips and there is a constant force needed to further withdraw the line. When the outer end of line 134 is secured the spring will act to become de-energized, causing rotation of spring drum 90 and reel 128 in a clockwise direction as viewed in Figure 1, and gear 110 and consequently drum portion 130 will be rotated at the same speed as spring drum 90, in a clockwise direction due to the ratchet connection 108—106, the ratchet 106 causing rotation of the gear 110 through pushing pawls 108 in said clockwise direction.

The spring assembly 96 will, therefore, cause a certain tightening effect on the line 134 and the line 134 can be further tightened by moving the locking and tightening bracket 146 to engage gears 162 and 144. The pawl 164 will then prevent rotation of the reel 128 in a counterclockwise direction as viewed in Figure 1 and the handle 158 can be rotated in a counterclockwise direction to rotate the drum 128 in a clockwise direction to tighten the line.

When it is desired to retrieve the line the locking and tightening bracket 146 is moved to disengage gears 162 and 144. The end of the line 134 is then disconnected from its support, and the spring assembly 96 will move to become de-energized, causing rotation of the spring drum 90 in a clockwise direction as viewed in Figure 1, which will cause the ratchet gear 106 (Figures 4 and 7) to rotate the gear 110 through pushing pawls 108, which in turn causes a clockwise rotation of reel 128 to wind up the line 134. Thus in retrieving, the spring assembly 96 acts to rotate directly the reel.

After the spring assembly 96 has become de-energized, it is only necessary to move the line 134 a small amount to re-energize the spring its entire amount, and de-energization of the spring being then permitted will cause rewinding of a larger amount of line than was withdrawn from the reel to energize the spring. This is apparent because movement of the reel in an unwinding direction through 60°, for example, causes the drum 90 to be moved through 240° as the drum is rotated through the overdrive. But in permitting the spring assembly to move to become de-energized, the reel is rotated to wind the line through 240° as the drum 90 drives the reel directly to rewind. The increment of unwind, to energize the spring, can be repeated until all of the line is rewound on the drum. Of course, other ratios of gears can be used to vary the unwind-rewind ratio.

Figure 8:
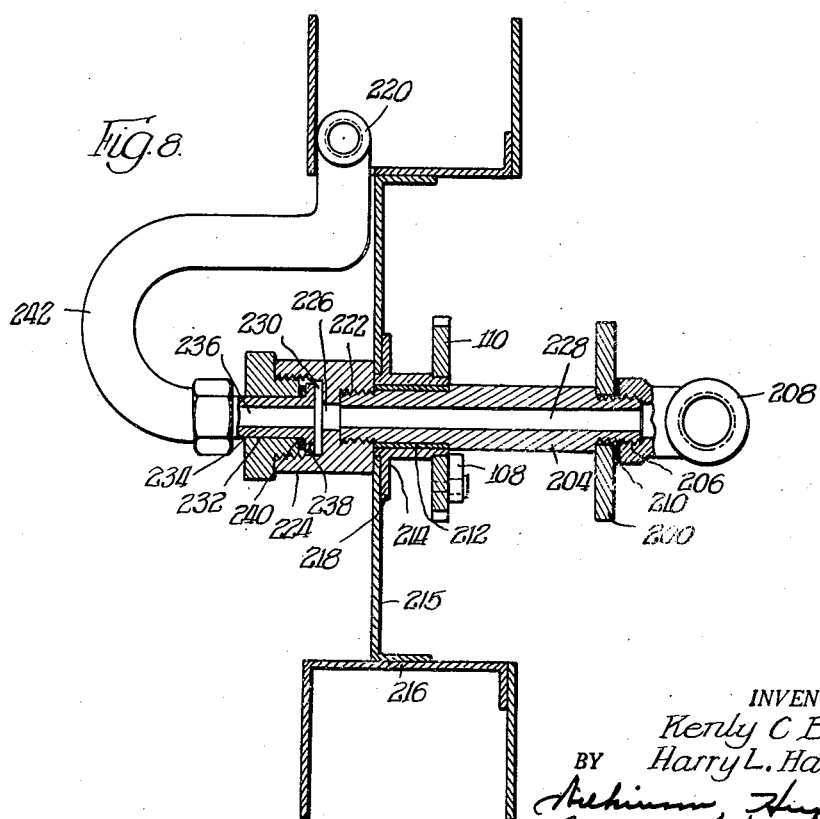
Figure 8 is a tranverse, fragmentary sectional elevation of a reel for dispensing fluids, such as an air or liquid hose reel which is adapted to utilize the rewinding mechanism illustrated in Figures 1 to 7, inclusive.

Referring now to the reel assembly illustrated in Figure 8, this assembly is illustrated as being adapted for use with fluid dispensing means, such as an air dispensing hose or a liquid dispensing hose.

The reel assembly comprises the bracket 200 which may be integral with or otherwise secured to a main support, such as a frame or the like, the bracket 200 corresponding to bracket 36. Hollow shaft 204 is threaded as at 206 and is secured by suitable fastening means to the fluid line manifold 208, which may be for either liquid or air, a suitable washer 210 being disposed between the manifold 208 and bracket 200.

Figure 6:
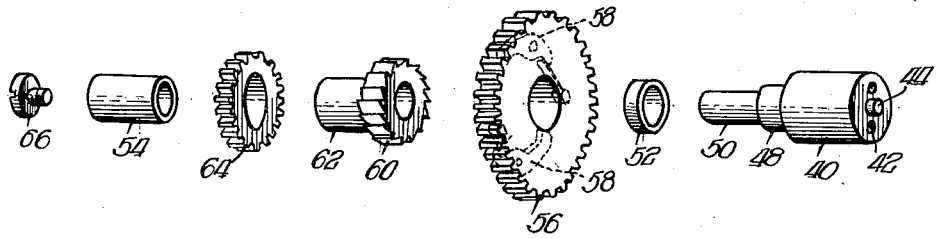
Figure 6 is an exploded perspective elevation through one of the sets of gearing of the rewind mechanism.
Figure 7:
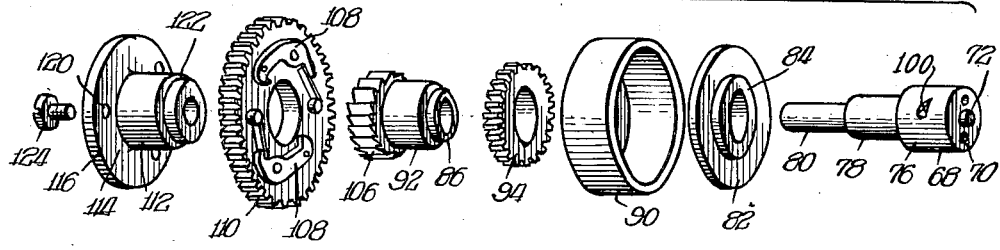
Figure 7 is an exploded perspective elevation through another of the sets of gearing of the rewind mechanism, but with the coil, clutch spring omitted.

The shaft 204 is disposed adjacent a shaft (not shown), similar to shaft 40, the latter shaft being provided with the gearing and other mechanism illustrated in Figure 6. The end of shaft 204 is provided with the bushing 212 on which the reel hub 214 is rotatably mounted, said hub 214 being similar to hub 114. The hub 214 is provided with the gear 110 having pawls 108, and the other gearing and mechanism as shown in Figure 7 is mounted on said shaft 204 whereby with the mechanism on the shaft similar to shaft 40, retrieving mechanism similar to that shown and described in Figures 1 to 7 is provided.

The web or arms 215 of storage reel 216 is secured to the flange 218 of the hub 214 and the hose 220 is adapted to be wound on said reel and withdrawn therefrom. If the hose 220 is for air, a suitable air chuck will be provided. If it is for liquid, a suitable valve or nozzle will be provided.

The end of shaft 204 is threaded as at 222 and the housing 224 is secured thereto, fixed with respect to the reel and providing an end bearing therefor. The housing 224 is provided with the passage 226 communicating with passage 228 of the shaft 204 and the passage 226 is provided with the enlarged seal passage 230. The end of the housing 224 is closed by means of the nut 232 and the rotatable hose fitting 234 having the passage 236 communicates with passage 228, said fitting 234 being provided with a shoulder 238 engaging the seal ring 240. The end of fitting 234 is connected through the hose 242 to hose 220. Fluid pressure being supplied from manifold 208 to hose 220 urges the rotating shoulder 238 of fitting 234 against the seal ring to provide a proper fluid tight connection.

The withdrawal and rewinding of the hose through the retrieving mechanism is exactly the same as described with respect to Figures 1 to 7 inclusive. In this case it is not necessary to provide a bracket similar to the locking bracket 146, although if desired, such a bracket may be provided with a stop for holding the reel 216 against retrieving rotation.

In the construction illustrated in Figures 9 and 10 the bracket 250, similar to bracket 36 is provided, suitably supported on any structure as desired. Hollow shaft 252 provided with the bore 254 is suitably secured as at 256 to the bracket 250, the shaft 252 being similar to shaft 68. A shaft (not shown), similar to shaft 40, is likewise secured to bracket 250 and is provided with the gearing and other mechanism illustrated in Figure 6. The end of shaft 252 is provided with bushing 258 on which the reel hub 260 is rotatably mounted, said hub being similar to hub 114. The hub is provided with the gear 110 provided with pawls 108, and shaft 252 is provided with the other mechanism illustrated in Figure 7. The mechanism of shaft 252 and that of the shaft corresponding to shaft 40 operate in the same manner as the retrieving mechanism as described in Figures 1 to 7 inclusive.

Reel 262 is fixed to the reel hub 260 by web or arms 263 and a positioning collar 264 is secured to shaft 252 for positioning the reel and providing an end bearing therefor. Shaft 252, outwardly of the collar 264, is provided with a slot 266 into which the insulated projection 268 of the insulating ring 270 extends. The insulating ring 270 is provided with the outer projection 272 separating the commutator rings 274 and 276. A contact frame 278 is rotatably mounted on shaft 252 outwardly of the collar 264 and extends radially to the reel 262.

In Figure 9 the reel assembly is illustrated for the storage of an electrical conductor such as wire, the wire being stored on the reel 262 and being adapted to wind thereon and unwind therefrom, a suitable end connection such as an electric plug, or other connection, being provided depending on the use to which the reel is to be put. The conductors 280 are electrically connected through conductors 282 and 284 to the spring pressed brushes 286 and 288, which have electrical contact with the commutators 274 and 276. The commutators 274 and 276 are electrically connected to conductors 290 and 292 extending through passage 254 of shaft 252 to a suitable source of electrical energy. The unwind and rewind of the electrical conductor 280 is exactly the same as contemplated for the line illustrated in Figures 1 to 7 inclusive.

As in the case of the reel shown in Figure 8, no bracket as bracket 146 (Figure 1) need be provided, though a locking bracket may be provided if desired to prevent retrieving action of the reel until desired.

While reels for storage of clothes lines, hose and electrical conductors have been illustrated, other flexible members may be used, and the use of the reel in other connections is contemplated, and where "line" is used, it is of course understood that it is used in a generic sense, and it is to be further understood that this application is not to be limited by the exact embodiments of the device shown, which are merely by way of illustration and not limitation, as various and other forms of the device will, of course, be apparent to those skilled in the art without departing from the spirit of the invention or the scope of the claims.

We claim:

1. In reel mechanism, the combination of a support, first and second shafts fixed to said support in parallel relation to each other, a coil spring having one end fixed to said first shaft, the outer end of said coil spring being provided with a spring shoe of stiffer material than said coil spring, a drum rotatable on said first shaft and enclosing said spring and shoe, said shoe having frictional engagement with said drum, said drum having a gear and ratchet gear fixed thereto, a reel hub rotatably mounted on said first shaft and having a first pawl gear fixed thereto and provided with pawls engaging said ratchet gear, a gear rotatably mounted on said second shaft and meshing with said pawl gear, the pawl gear being larger than the gear meshing therewith, said gear on said second shaft having a ratchet gear fixed thereto, a second pawl gear rotatably mounted on said second shaft having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, and a reel secured to said reel hub.

2. In reel mechanism, the combination of a support, first and second shafts carried by said support in parallel relation to each other, a coil spring having one end fixed to said first shaft, the outer end of said coil spring being provided with a shoe, a drum on said first shaft and enclosing said spring and shoe, said shoe having frictional engagement with said drum, said drum having a gear and ratchet gear fixed thereto, a reel hub mounted on said first shaft and having a first pawl gear fixed thereto and provided with pawls engaging said ratchet gear, a gear on said second shaft and meshing with said pawl gear, the pawl gear being larger than the gear meshing therewith, said gear on said second shaft having a ratchet gear fixed thereto, a second pawl gear on said second shaft having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount, thereafter maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to said predetermined amount, and a reel secured to said reel hub.

3. In reel mechanism, the combination of a support, first and second shafts fixed to said support in parallel relation to each other, a coil spring having one end fixed to said first shaft, the outer end of said coil spring being provided with a spring shoe of stiffer material than said coil spring, a drum rotatable on said first shaft and enclosing said spring and shoe, said shoe having frictional engagement with said drum, said drum having a gear and ratchet gear fixed thereto, a reel hub rotatably mounted on said first shaft and having a first pawl gear fixed thereto and provided with pawls engaging said ratchet gear, a gear rotatably mounted on said second shaft and meshing with said pawl gear, the pawl gear being larger than the gear meshing therewith, said gear on said second shaft having a ratchet gear fixed thereto, a second pawl gear rotatably mounted on said second shaft having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, a reel secured to said reel hub, a reel gear fixed to said reel, a bracket pivoted to said support and provided with a pinion, means for rotating the pinion, and a pawl for preventing rotation of the pinion in more than one direction, said bracket being movable to cause said pinion to engage said reel gear to lock said reel against rotation in one direction, said pinion being rotatable to rotate said reel in the other direction.

4. In reel mechanism, the combination of a support, first and second shafts carried by said support in parallel relation to each other, a coil spring having one end fixed to said first shaft, the outer end of said coil spring being provided with a shoe, a drum on said first shaft and enclosing said spring and shoe, said shoe having frictional engagement with said drum, said drum having a gear and ratchet gear fixed thereto, a reel hub mounted on said first shaft and having a first pawl gear fixed thereto and provided with pawls engaging said ratchet gear, a gear on said second shaft and meshing with said pawl gear, the pawl gear being larger than the gear meshing therewith, said gear on said second shaft having a ratchet gear fixed thereto, a second pawl gear on said second shaft having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount, thereafter maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to said predetermined amount, a reel secured to said reel hub, a reel gear fixed to said reel, a bracket pivoted to said support and provided with a pinion, means for rotating the pinion, and a pawl for preventing rotation of the pinion in more than one direction, said bracket being movable to cause said pinion to engage said reel gear to lock said reel against rotation in one direction, said pinion being rotatable to rotate said reel in the other direction.

5. In reel mechanism, the combination of a support, first and second shafts fixed to said support in parallel relation to each other, a coil spring having one end fixed to said first shaft, the outer end of said coil spring being provided with a spring shoe of stiffer material than said coil spring, a drum rotatable on said first shaft and enclosing said spring and shoe, said shoe having frictional engagement with said drum, said drum having a gear and ratchet gear fixed thereto, a reel hub rotatably mounted on said first shaft and having a first pawl gear fixed thereto and provided with pawls engaging said ratchet gear, a gear rotatably mounted on said second shaft and meshing with said pawl gear, the pawl gear being larger than the gear meshing therewith, said gear on said second shaft having a ratchet gear fixed thereto, a second pawl gear rotatably mounted on said second shaft having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, a reel secured to said reel hub, a reel gear fixed to said reel, a bracket pivoted to said support and provided with a pinion, means for rotating the pinion, said bracket being movable to cause said pinion to engage said reel gear, said pinion being rotatable to rotate said reel gear, and a pawl provided on said bracket for preventing rotation of said reel in the direction to energize said spring.

6. In reel mechanism, the combination of a support, a coil spring having one end fixed to said support, the other end of said spring having a shoe, a drum rotatably mounted with respect to said support and enclosing said spring and shoe, said shoe having frictional engagement with said drum, said drum having a gear and ratchet gear fixed thereto, a reel hub having a first pawl gear fixed thereto and provided with pawls engaging said ratchet gear whereby said pawl gear rotates with said ratchet gear in one direction and free from said ratchet gear in the opposite direction, a gear rotatable with respect to said support meshing with said pawl gear, the pawl gear being larger than the gear meshing therewith, the gear which meshes with the pawl gear having a ratchet gear fixed thereto, a second pawl gear rotatably mounted on said support having pawls engaging said last named ratchet gear, said second pawl gear meshing with said first named gear and being larger than said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, and a reel secured to said reel hub.

7. In reel mechanism, the combination of a support, first and second shafts fixed to said support in parallel relation to each other, a coil spring having one end fixed to said first shaft, the outer end of said coil spring being provided with a spring shoe of stiffer material than said coil spring, a drum rotatable on said first shaft and enclosing said spring and shoe, said shoe having frictional engagement with said drum, said drum having a gear and ratchet gear fixed thereto, a reel hub rotatably mounted on said first shaft and having a first pawl gear fixed thereto and provided with pawls engaging said ratchet gear, a gear rotatably mounted on said second shaft and meshing with said pawl gear, said gear on said second shaft having a ratchet gear fixed thereto, a second pawl gear rotatably mounted on said second shaft having pawls engaging said last named ratchet gear, said second pawl gear meshing with said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, and a reel secured to said reel hub.

8. In reel mechanism, the combination of a support, first and second shafts fixed to said support in parallel relation to each other, a coil spring having one end fixed to said first shaft, the outer end of said coil spring being provided with a spring shoe of stiffer material than said coil spring, a drum rotatable on said first shaft and enclosing said spring and shoe, said shoe having frictional engagement with said drum, said drum having a gear and ratchet gear fixed thereto, a reel hub rotatably mounted on said first shaft and having a first pawl gear fixed thereto and provided with pawls engaging said ratchet gear, a gear rotatably mounted on said second shaft and meshing with said pawl gear, said gear on said second shaft having a ratchet gear fixed thereto, a second pawl gear rotatably mounted on said second shaft having pawls engaging said last named ratchet gear, said second pawl gear meshing with said first named gear, the ratchet gears, pawls and gears being so arranged and said spring and drum being so arranged that rotation of said reel hub in one direction causes said drum to rotate a greater amount than said reel hub to energize said spring a predetermined amount after which said shoe slips with respect to said drum, thereby maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, a reel secured to said reel hub, a reel gear fixed to said reel, a bracket pivoted to said support and provided with a pinion having means for rotating the pinion, and a pawl for preventing rotation of the pinion in more than one direction, said bracket being movable to cause said pinion to engage said reel gear to lock said reel against rotation in one direction, said pinion being rotatable to rotate said reel in the other direction.

9. In reel mechanism, the combination of a support, first and second shafts carried by said support in parallel relation to each other, a coil spring having one end fixed to said first shaft, the outer end of said coil spring being provided with a shoe, a drum on said first shaft and enclosing said spring and shoe, said shoe having frictional engagement with said drum, said drum having a gear and ratchet gear fixed thereto, a reel hub mounted on said first shaft and having a first pawl gear fixed thereto and provided with pawls engaging said ratchet gear, a gear on said second shaft and meshing with said pawl gear, said gear on said second shaft having a ratchet gear fixed thereto, a second pawl gear on said second shaft having pawls engaging said last named ratchet gear, said second pawl gear meshing with said first named gear, the ratchet gears, pawls and gears being so arranged and said spring and drum being so arranged that rotation of said reel hub in one direction causes said drum to rotate a greater amount than said reel hub to energize said spring a predetermined amount, thereafter maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, and a reel secured to said reel hub.

10. In reel mechanism, the combination of a support, first and second shafts carried by said support in parallel relation to each other, a coil spring having one end fixed to said first shaft, the outer end of said coil spring being provided with a shoe, a drum on said first shaft and enclosing said spring and shoe, said shoe having frictional engagement with said drum, said drum having a gear and ratchet gear fixed thereto, a reel hub mounted on said first shaft and having a first pawl gear fixed thereto and provided with pawls engaging said ratchet gear, a gear on said second shaft and meshing with said pawl gear, said gear on said second shaft having a ratchet gear fixed thereto, a second pawl gear on said second shaft having pawls engaging said last named ratchet gear, said second pawl gear meshing with said first named gear, the ratchet gears, pawls and gears being so arranged and said spring and drum being so arranged that rotation of said reel hub in one direction causes said drum to rotate a greater amount than said reel hub to energize said spring a predetermined amount thereafter maintaining a substantially constant energization of said spring, release of said hub permitting said spring to become de-energized by directly rotating the first pawl gear by said first named ratchet gear to rotate the reel hub whereby said reel hub may be rotated a greater amount by said spring than the reel hub was rotated to energize said spring to a point to cause said shoe to slip, a reel secured to said reel hub, a reel gear fixed to said reel, a bracket pivoted to said support and provided with a pinion having means for rotating the pinion, and a pawl for preventing rotation of the pinion in more than one direction, said bracket being movable to cause said pinion to engage said reel gear to lock said reel against rotation in one direction, said pinion being rotatable to rotate said wheel in the other direction.

11. In a reel assembly, the combination of a support, a reel rotatably mounted on said support, a drum rotatably mounted on said support, rewind mechanism associated with said reel and support, said rewind mechanism including a spring adapted to be energized by rotation of said drum in an unwinding direction, means interposed between said spring and reel for rotating said drum a greater amount in an unwinding direction than the reel is rotated in said unwinding direction, said last named means being operative, upon deenergizing movement of the spring, to rotate the reel in a rewind direction substantially the same amount as said drum is rotated in a rewind direction.

12. In a reel assembly, the combination of a support, a reel rotatably mounted on said support, a drum rotatably mounted on said support, rewind mechanism associated with said reel and support, said rewind mechanism including a spring adapted to be energized by rotation of said drum in an unwinding direction, means interposed between said spring and reel for rotating said drum a greater amount in an unwinding direction than the reel is rotated in said unwinding direction, said last named means having a portion inoperative in a rewind direction to cause said spring to rotate said drum and reel an equal amount in the rewind direction.

13. In a reel assembly, the combination of a support, a reel rotatably mounted on said support, a drum rotatably mounted on said support, rewind mechanism associated with said reel and support, said rewind mechanism including a spring adapted to be energized by rotation of said drum in an unwinding direction, means interposed between said spring and reel for rotating said drum a greater amount in an unwinding direction than the reel is rotated in said unwinding direction, said last named means being operative, upon deenergizing movement of the spring, to rotate the reel in a rewind direction substantially the same amount as said drum is rotated in a rewind direction, and means adapted to be connected to said reel for rotating said drum in a rewind direction and preventing rotation of said reel in an unwind direction.

14. In a reel assembly, the combination of a support, a reel rotatably mounted on said support, a drum rotatably mounted on said support, rewind mechanism associated with said reel and support, said rewind mechanism including a spring adapted to be energized by rotation of said drum in an unwinding direction, means interposed between said spring and reel for rotating said drum a greater amount in an unwinding direction than the reel is rotated in said unwinding direction, said last named means having a portion inoperative in a rewind direction to cause said spring to rotate said drum, and reel an equal amount in the rewind direction, and means adapted to be connected to said reel for rotating said drum in a rewind direction and preventing rotation of said reel in an unwind direction.

15. In a reel assembly, the combination of a support, a reel rotatably mounted on said support, a member rotatably mounted on said support, rewind mechanism associated with said reel and support, said rewind mechanism including a spring adapted to be energized by rotation of said reel in an unwinding direction, and means interposed between said spring and reel for rotating said member a greater amount than the reel when the reel is rotated in an unwinding direction to energize said spring, said means including means for connecting said member and reel to rotate the same amount when the spring is moving to de-energize.

16. In a reel assembly, the combination of a support, a reel rotatably mounted on said support, rewind mechanism associated with said reel and support, said rewind mechanism including a spring adapted to be energized by rotation of said reel in an unwinding direction, and means interposed between said spring and reel for causing said spring to be energized a predetermined amount for a predetermined unwinding movement of said reel, said means including means operative upon deenergizing said spring for causing rewinding of said reel a greater amount than the amount said reel unwound in energizing said spring said predetermined amount.

17. In combination, a support, a member rotatably mounted on said support, rewind mechanism associated with said member and support, said rewind mechanism including a spring adapted to be energized by rotation of said member in an unwinding direction, and means interposed between said spring and member rotating a greater amount when the member is rotated in an unwinding direction than the member is rotated in said unwinding direction, said last named means being operative to cause rotation of the member in a rewind direction a greater amount than said member is rotated in an unwinding direction.

18. In combination, a support, a member rotatably mounted on said support, rewind mechanism associated with said member and support, said rewind mechanism including a spring adapted to be energized by rotation of said member in an unwinding direction, and means interposed between said spring and member rotating a greater amount when the member is rotated in an unwinding direction than the member is rotated in said unwinding direction, said last named means being operative to cause rotation of the member in a rewind direction substantially the same amount as said means is rotated in a rewind direction.

19. In combination, a support, a member rotatably mounted on said support, rewind mechanism associated with said member and support, said rewind mechanism including a spring adapted to be energized by rotation of said member in an unwinding direction, and means interposed between said spring and member for energizing said spring a predetermined amount for a predetermined movement of the member in an unwinding direction, said means operating to permit said spring to rotate the member a greater amount in a rewinding direction than said predetermined movement of the member, when said spring is moving to de-energized position.

20. A combination as recited in claim 19 wherein means is provided adapted to be connected to said member for rotating said member in a rewinding direction and preventing rotation of said member in an unwinding direction.

21. In combination, a support, a reel rotatably mounted on said support, rewind mechanism associated with said reel and support, said rewind mechanism including means adapted to be energized a predetermined amount by rotation of said drum a predetermined amount in an unwinding direction, and means for causing said reel to rotate a greater amount in a rewinding direction when the first named means is de-energized than the reel was rotated in said unwinding direction in energizing said first named means.

22. In a reel assembly, the combination of a support, a reel rotatably mounted on said support, a drum rotatably mounted on said support, rewind mechanism associated with said reel and support, said rewind mechanism including a spring adapted to be energized a predetermined amount by rotation of said drum a predetermined amount in an unwinding direction, connection means between said spring and drum, movement of said drum beyond said predetermined amount causing said connection means to become operative whereby said spring is energized only said predetermined amount, means interposed between said spring and reel for rotating said drum a greater amount in an unwinding direction than the reel is rotated in said unwinding direction when the spring is moved to position where it is energized said predetermined amount, said last named means being operative to permit said spring to rotate the reel in a rewind direction substantially the same amount as said drum is rotated in a rewind direction as said spring de-energizes.

23. A reel assembly as recited in claim 22 wherein means is provided adapted to be connected to said reel for rotating said drum in a rewind direction and preventing rotation of said reel in an unwind direction.

24. In combination, a support, a member rotatably mounted on said support, rewind mechanism associated with said member and support, said rewind mechanism including a spring adapted to be energized a predetermined amount by rotation of said member a predetermined amount in an unwinding direction, connection means between said spring and member, movement of said member beyond said predetermined amount causing said connection means to become operative whereby said spring is energized only said predetermined amount, means interposed between said spring and member operative upon de-energizing movement of the spring from its predetermined energized amount condition for rotating said member a greater amount in a rewinding direction than the member is rotated in said unwinding direction.

25. A combination as recited in claim 24 wherein means is provided adapted to be connected to said member for rotating said member in a rewind direction and preventing rotation of said member in an unwind direction.

KENLY C. BUGG.
HARRY L. HART.

REFERENCES CITED

The following references are of record in the file of this patent:

UNITED STATES PATENTS

| Number | Name | Date |
|---|---|---|
| 345,052 | Harrison | July 6, 1886 |
| 2,013,733 | Murphy | Sept. 10, 1935 |
| 2,034,543 | Twiss et al. | Mar. 17, 1936 |
| 2,219,201 | Smith | Oct. 22, 1940 |
| 2,231,852 | Lear | Feb. 11, 1941 |
| 2,334,141 | Zierden | Nov. 9, 1943 |
| 2,391,141 | Dour et al. | Dec. 18, 1945 |